United States Patent
Kareenahalli et al.

(10) Patent No.: US 7,672,178 B2
(45) Date of Patent: Mar. 2, 2010

(54) DYNAMIC ADAPTIVE READ RETURN OF DRAM DATA

(75) Inventors: Suryaprasad Kareenahalli, Folsom, CA (US); Zohar Bogin, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 516 days.

(21) Appl. No.: 11/648,855

(22) Filed: Dec. 29, 2006

(65) Prior Publication Data

US 2008/0159022 A1    Jul. 3, 2008

(51) Int. Cl.
*G11C 7/00*    (2006.01)

(52) U.S. Cl. .................. 365/193; 365/194; 365/189.15

(58) Field of Classification Search .................. 365/193, 365/194, 189.15
See application file for complete search history.

(56) References Cited

U.S. PATENT DOCUMENTS

2006/0203602 A1*    9/2006    Best et al. .................... 365/233

\* cited by examiner

*Primary Examiner*—Hoai V Ho
*Assistant Examiner*—Kretelia Graham
(74) *Attorney, Agent, or Firm*—Dana B. Lemoine; Lemoine Patent Services, PLLC (57) ABSTRACT

An integrated circuit communicates with memory devices. Data from the memory devices arrives at the integrated circuit with varying propagation delays. The integrated circuit detects the arrival of data from the memory devices, and stores the data in FIFOs. A FIFO drain signal is generated responsive to the detection of the data arrival.

20 Claims, 11 Drawing Sheets

DYNAMIC ADAPTIVE READ RETURN OF DRAM DATA

FIELD

The present invention relates generally to integrated circuits, and more specifically to signaling over relatively large distances in integrated circuits.

BACKGROUND

During a memory read operation, memory controllers typically send commands to memory devices and then receive data from the memory devices. Propagation delays to and from the memory devices may vary. In addition, propagation delays within the memory controller may vary. A memory controller may wait a worst-case delay time before passing the received data to a requestor. When all memory devices are faster than the worst-case delay time, unnecessary latency may be introduced.

DESCRIPTION OF EMBODIMENTS

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

Figure 1:
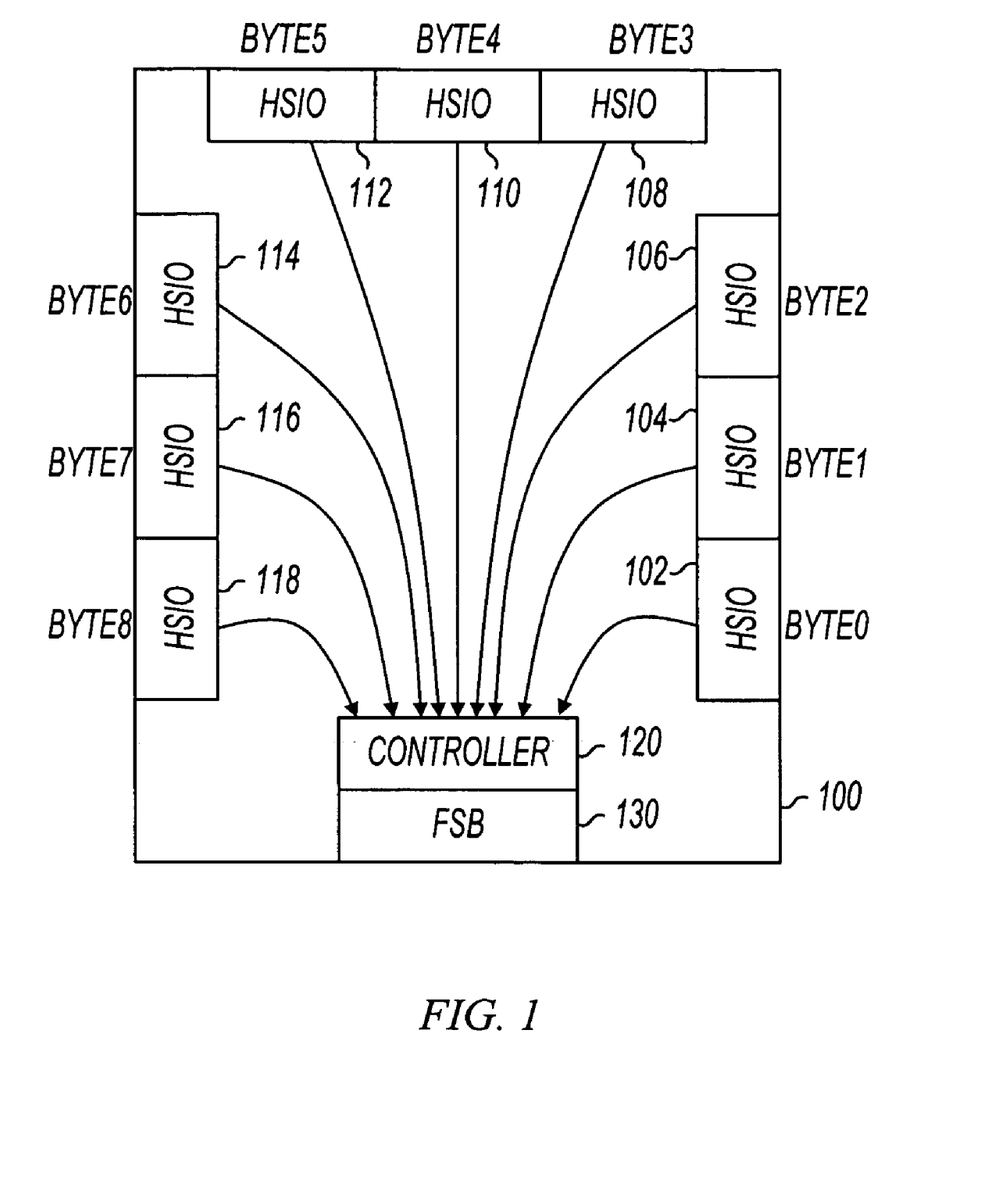
FIG. 1 shows a diagram of data flow in an integrated circuit.

FIG. 1 shows a diagram of data flow in an integrated circuit. Integrated circuit 100 includes high speed input/output (HSIO) circuits 102, 104, 106, 108, 110, 112, 114, 116, and 118, controller 120, and front side bus (FSB) interface 130. The HSIO circuits receive data from outside the integrated circuit and provide the data to controller 120, which in turn provides the data to other integrated circuits on the front side bus. In some embodiments, integrated circuit 100 may be a memory controller or a graphics controller that is coupled between the front side bus and memory modules. For example, each of the HSIO circuits may be coupled to a memory device such as a dynamic random access memory (DRAM) device. In response to a request for data, controller 120 may initiate a read request from the DRAM, and then the DRAM provides data to integrated circuit 100. Integrated circuit 100 then receives the DRAM data at the HSIO circuits.

The HSIO circuits are shown stylistically as being placed around the perimeter of integrated circuit 100 to illustrate that in practice, the routing delays from the HSIO circuits to controller 120 may vary from one HSIO circuit to another. Data pins on the packaged integrated circuit may be placed around the perimeter of integrated circuit 100, and may also be interleaved.

Due to DRAM timing variations and signal propagation variations, DRAM data is received asynchronously at the HSIO circuits. A source synchronous strobe signal may be received with the DRAM data, but the timing of the received data is treated as asynchronous with respect to the synchronous operation of other circuits within integrated circuit 100. As described further below, the HSIO circuits receive DRAM data, and provide the data along with a source synchronous strobe to controller 120. Each of the HSIO circuits may provide a separate source synchronous strobe along with data, effectively producing a separate clock domain corresponding to each HSIO circuit (the "input data clock domains").

Front side bus interface 130 operates synchronously in a clock domain shared with other integrated circuits on the bus (the "FSB clock domain"). Controller 120 receives the internal data and source synchronous strobes from the HSIO circuits (in multiple asynchronous clock domains), and provides the data to FSB interface 130 in the FSB clock domain.

Controller 120 includes at least one first-in-first-out (FIFO) circuit to store the data received from the HSIO circuits. The internal data is written to the FIFO in the input data clock domains, and is drained from the FIFO in the FSB clock domain. To ensure no loss of data, the FIFO drain operation is not commenced until enough time has passed to ensure the data in the FIFO is stable, and can be read without error.

In some embodiments of the present invention, controller 120 includes detection circuitry to detect when data has arrived from the HSIO circuits, and also includes circuitry to produce FIFO drain signals in response to detecting the data arrival. By timing the FIFO drain condition to the arrival of the data, the FIFO can be drained soon after filling, thereby reducing latency. These embodiments and others are described more fully below.

Integrated circuit 100 is shown having nine HSIO circuits. This corresponds to nine byte-wide data lanes to accommodate a memory module with nine byte-wide devices. The various embodiments of the invention are not limited in this regard. For example, any number of HSIO circuits may be present, and each may be narrower or wider than one byte.

The data rate outside integrated circuit 100 may be different than a data rate inside integrated circuit 100. For example, data may be received from the DRAMs at four times the internal data rate of integrated circuit 100. In these embodiments, the HSIO circuits demultiplex the received data onto four parallel data paths, each at one fourth the data rate of the DRAM data. Embodiments including demultiplexing in the HSIO circuits are described more fully below.

Figure 2:
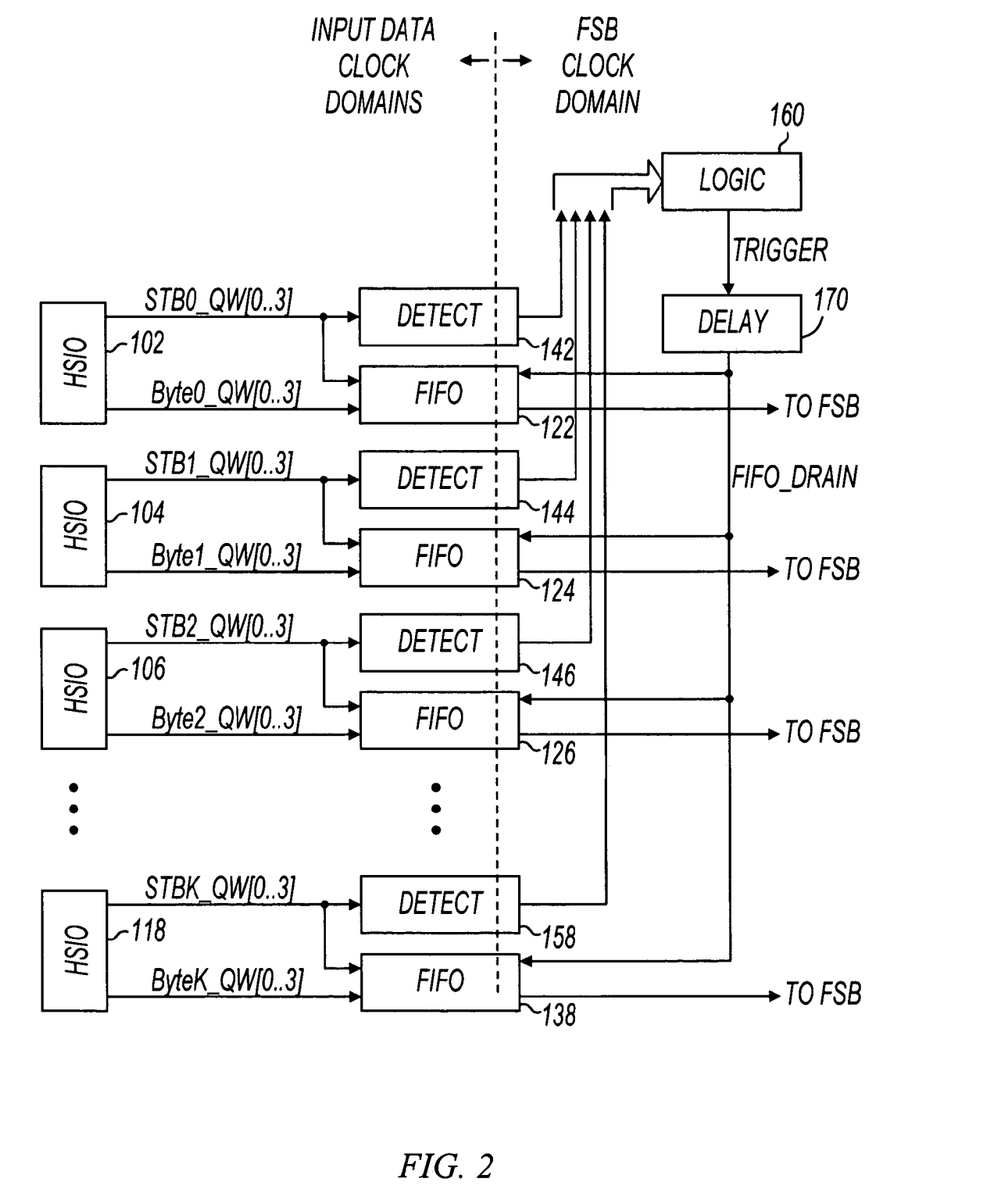
FIG. 2 shows circuits to propagate data from one clock domain to another.

FIG. 2 shows circuits to propagate data from one clock domain to another. FIG. 2 shows HSIO circuits 102, 104, 106, and 118; FIFO circuits 122, 124, 126, and 138; strobe detection circuits 142, 144, 146, and 158; logic 160, and delay element 170. The FIFO circuits, strobe detection circuits, logic 160, and delay element 170 correspond to circuits within controller 120 (FIG. 1).

In embodiments represented by FIG. 2, each HSIO circuit receives one byte-wide data stream at a first clock frequency, and provides four byte-wide internal data streams at one fourth the first clock frequency. The increased number of signal lines are not explicitly shown in FIG. 2. Eight lanes of IB data make one quad-word (QW) and the four quad-words being labeled as QW0, QW1, QW2, and QW3. The HSIO circuits demultiplex the data to provide all QW0s as one internal data stream, all QW1s as one internal data stream, all QW2s as one internal data stream, and all QW3s as one internal data stream. As shown in FIG. 2, the nomenclature ByteK_QW0 refers to Kth Byte lane of the quad-word zero received from the DRAM. In the examples described herein, K may be from 0 . . . 8, but this is not a limitation of the present invention.

Each HSIO circuit also provides a source synchronous strobe signal for each quad-word. The nomenclature STBK_QW0 refers to a strobe timed with Kth byte lane of the quad-word zero received from the DRAM. In embodiments represented by FIG. 2, each HSIO circuit provides four strobe signals: one for each quad-word.

As described above with reference to FIG. 1, each of the HSIO circuits provide an internal data stream in an "input data clock domain" that is treated as asynchronous to all others. Further, the FIFOs are filled in the input data clock domains, and are then drained in the FSB clock domain.

In a typical DRAM read event, data is requested from the DRAMs, and then DRAM data shows up after a read delay time ($t_{rd}$) plus a propagation delay time ($t_{pd}$). Prior to this time, the strobe signals sourced by the HSIO circuits are static. When the data shows up, the strobe signals become active to indicate the arrival of data. Strobe detection circuits 142, 144, 146, and 158 detect the arrival of the strobe signals, and provide a strobe detection signal synchronized to the FSB clock domain. Any one of the strobe detection circuits may be the first to detect a strobe signal, because any one of the strobe signals may arrive first.

Logic 160 receives the strobe detection signals from each of the strobe detection circuits, and begins a process that culminates in the draining of the FIFOs in the FSB clock domain. When the first strobe is detected, logic 160 launches a "trigger" signal into delay element 170. After the time delay provided by delay element 170, the FIFOs are drained. Delay element 170 may have a fixed delay or a programmable delay. Various embodiments are described more fully below. The time delay provided by delay element 170 corresponds to the largest differential delay possible between the slowest data path and the fastest data path. The differential delay is typically much smaller than the read latency ($t_{rd}+t_{pd}$). The differential delay can be controlled by careful design techniques. The amount of delay to be provided may also be determined heuristically.

Figure 3:
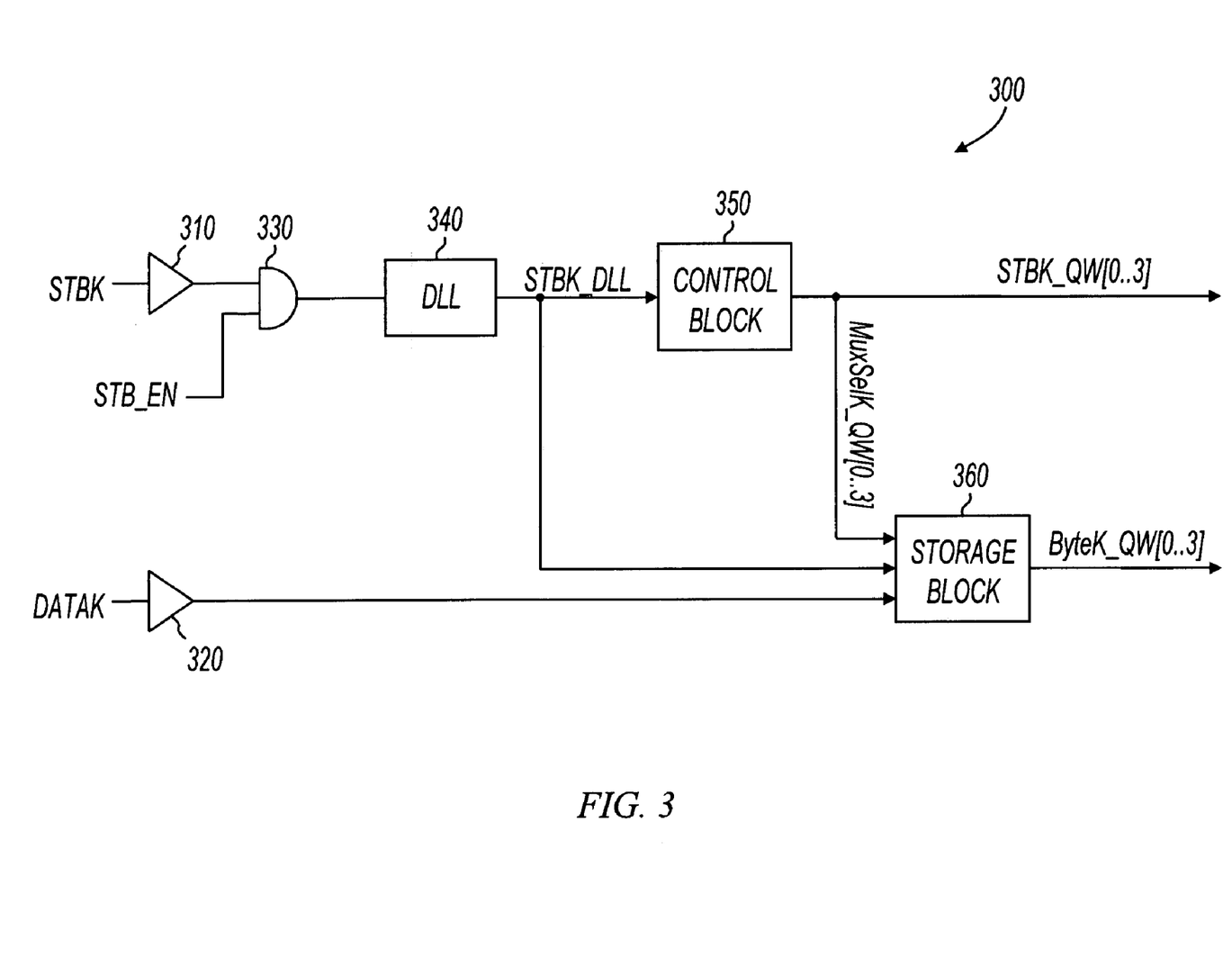
FIG. 3 shows a diagram of a high speed input output circuit.

FIG. 3 shows a diagram of a high speed input output (HSIO) circuit. HSIO circuit 300 includes buffers 310 and 320, logic gate 330, delay locked loop (DLL) circuit 340, control block 350, and storage block 360.

HSIO circuit 300 receives data (DATAK) from a source external to the integrated circuit. For example, DATAK may be sourced by a DRAM device, and HSIO circuit 300 may be within a memory controller. DATAK may be any width. In some embodiments, DATAK includes eight bits, and is referred to as the Kth "byte lane." In these embodiments, buffer 320 includes eight separate buffers: one to receive each bit of the byte lane. Buffer 320 sources DATAK to storage block 360.

Buffer 310 receives a strobe signal (STBK) associated with the Kth byte lane. In some embodiments, STBK is a "half-rate" clock signal that transitions at the same rate as DATAK. In these embodiments, DATAK may change once for each transition on STBK. Examples are shown in the timing diagram of FIG. 6. Logic gate 330 receives STBK and also receives a strobe enable (STB_EN) signal.

In operation, STBK may be at a static level (or an undefined level) between DRAM reads. For example, prior to a DRAM read operation, STBK may be in a high-impedance state. When a DRAM device responds to a read operation, the STBK signal may be driven to a known level prior to the first transition appearing on STBK. The first transition on STBK corresponds to the first valid data on DATAK. DLL 340 produces a delayed strobe signal (STBK_DLL) that is provided to control block 350 and storage block 360.

Storage block 360 receives one byte lane, and demultiplexes the received data into separate quad-word channels corresponding to quad-word zero (QW0), quad-word one (QW1), quad-word two (QW2), and quad-word three (QW3). HSIO circuit 300 corresponds to the Kth byte lane, and the data sourced by storage block 360 is shown as ByteK_QW[0 . . . 3]. Control block 350 provides four source synchronous strobe signals (STBK_QW[0 . . . 3]) timed with ByteK_QW[0 . . . 3]. The source synchronous strobe signals and the quad-word channels are provided internal to the integrated circuit, and are clocked into FIFO circuits as shown in FIG. 2. The operation of control block 350 is shown in FIG. 4, and an example embodiment of storage block 360 is shown in FIG. 5.

Figure 4:
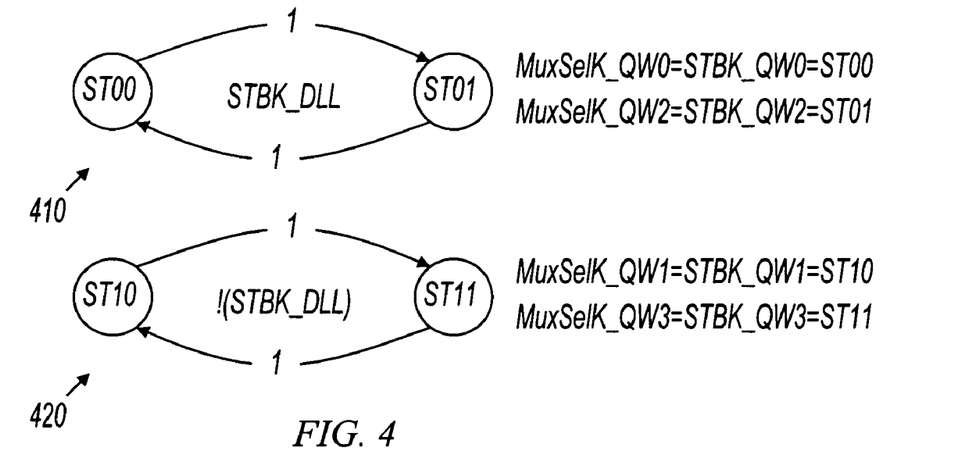
FIG. 4 shows state machine diagrams illustrating source synchronous strobe signal generation.

FIG. 4 shows state machine diagrams illustrating source synchronous strobe signal generation. State machines 410 and 420 illustrate the operation of control block 350 (FIG. 3). State machine 410 toggles from one state to another each time a rising edge of the strobe signal (STBK_DLL) is received. When state machine 410 transitions to state ST00, MuxSelK_QW0 and STBK_QW0 are asserted. Similarly, when state machine 410 transitions to state ST01, MuxSelK_QW2 and STBK_QW2 are asserted. State machine 420 toggles from one state to another each time a falling edge of the strobe signal (STBK_DLL) is received. When state machine 420 transitions to state ST10, MuxSelK_QW1 and STBK_QW1 are asserted. Similarly, when state machine 420 transitions to state ST11, MuxSelK_QW3 and STBK_QW3 are asserted. These signal relationships are shown in FIG. 6.

Figure 5:
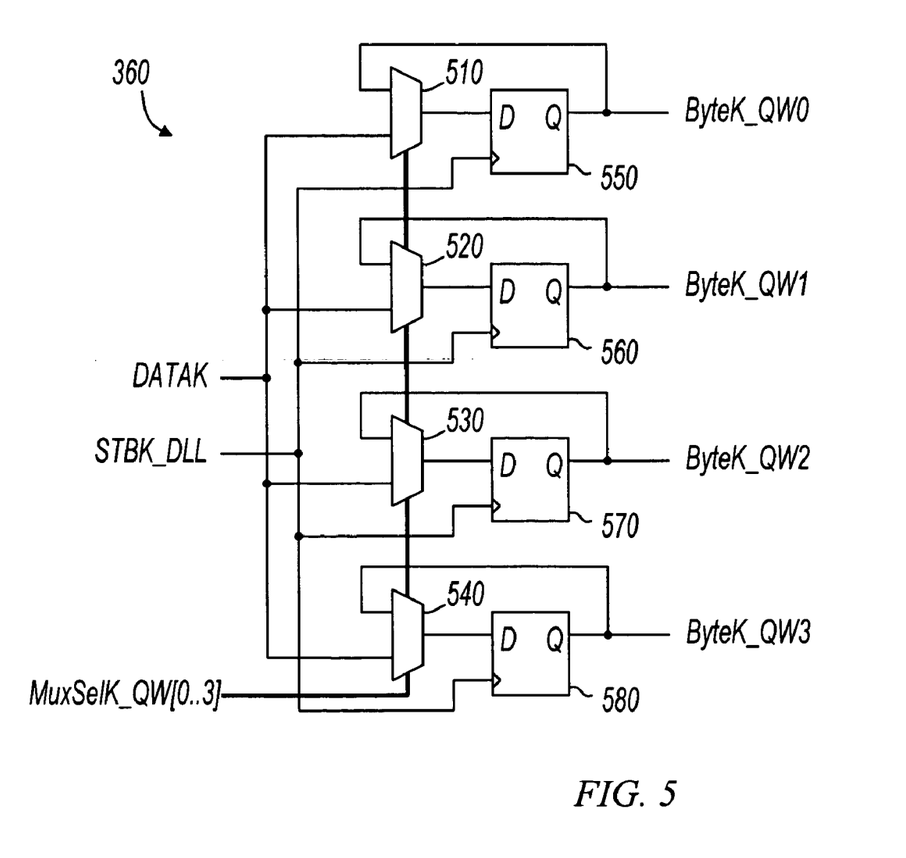
FIG. 5 shows a storage block in a high speed input output circuit.

FIG. 5 shows a storage block in a high speed input output circuit. Storage block 360 receives DATAK and STRBK_DLL, and produces four quad-word data streams ByteK_QW0, ByteK_QW1, ByteK_QW2, and ByteK_QW3. Multiplexers 510, 520, 530, and 540 receive DATAK and are controlled by the four multiplexer select signals MuxSelK_QW[0 . . . 3]. Each storage element 550, 560, 570, and 580 stores one of the quad-words, and provides one of ByteK_QW[0 . . . 3] within the integrated circuit. As shown in FIG. 5, storage block 360 demultiplexes the received data DATAK into four parallel data streams, where each data stream represents one quad-word.

Figure 6:
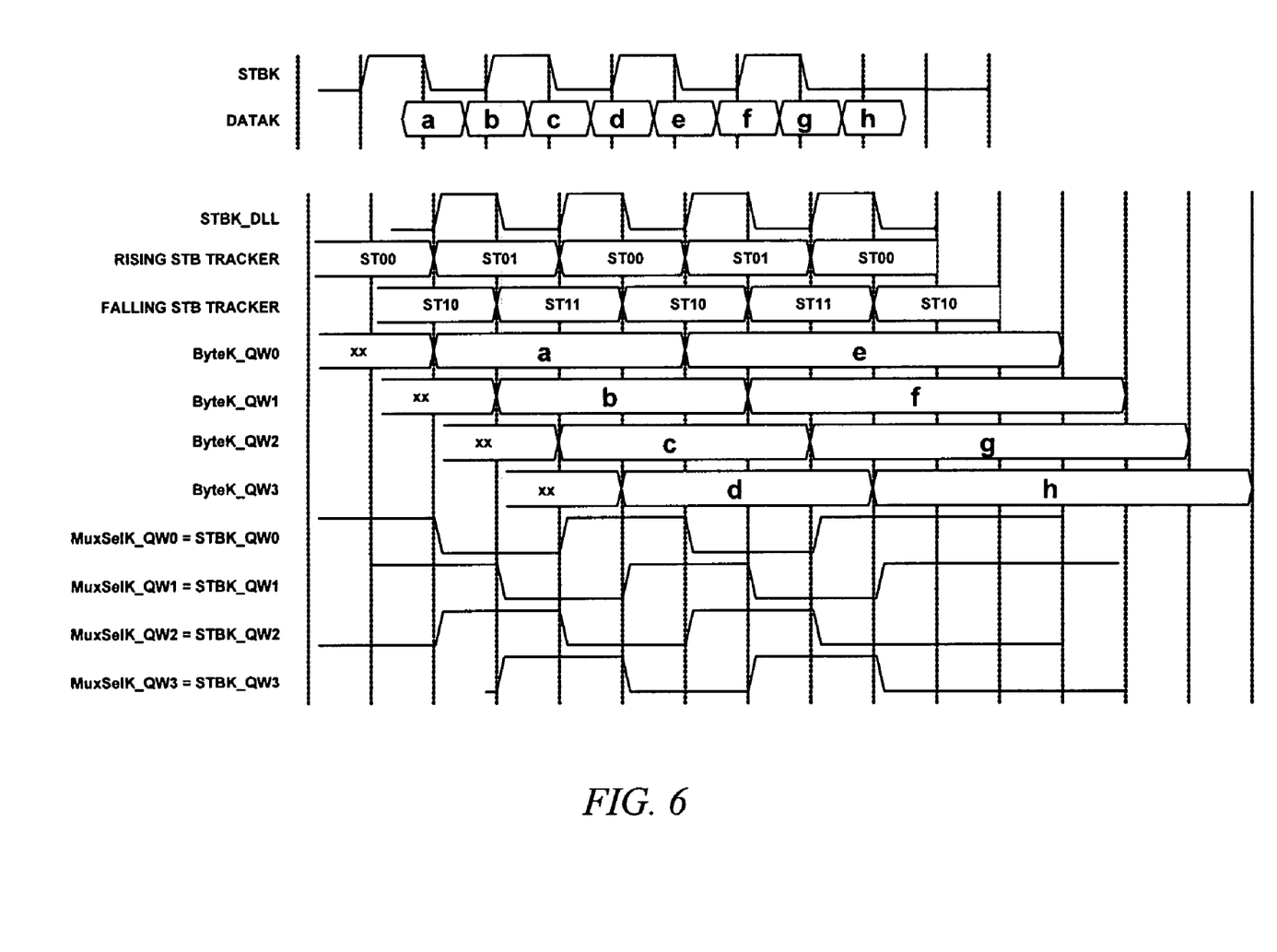
FIG. 6 shows a timing diagram demonstrating the operation of the high speed input output circuit of FIG. 3.

FIG. 6 shows a timing diagram demonstrating the operation of the high speed input output circuit of FIG. 3. STBK and DATAK are shown at the top of FIG. 6. In this example, STBK is a half-rate clock signal that transitions once for each data transition of DATAK. STBK_DLL shows the strobe signal sourced by DLL 340 (FIG. 3). The rising and falling strobe trackers show the operation of the state machines shown in FIG. 4. The four quad-words ByteK_QW0, ByteK_QW1, ByteK_QW2, and ByteK_QW3 are shown with data demultiplexed from DATAK. At the bottom of FIG. 6, STBK_QW[0 . . . 3] are shown.

Figure 7:
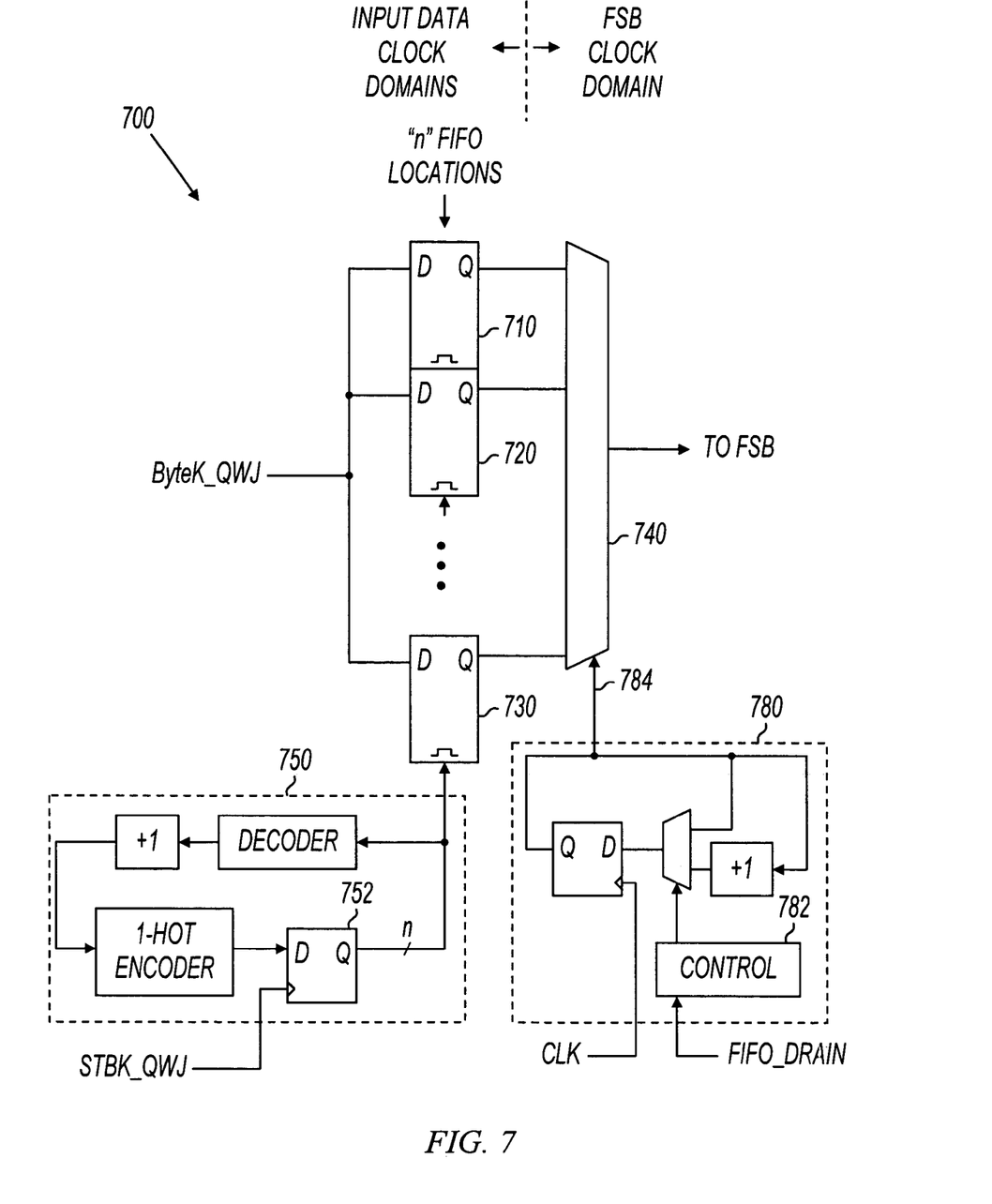
FIG. 7 shows a first-in-first-out (FIFO) storage block.

FIG. 7 shows a first-in-first-out (FIFO) storage block. FIFO storage block 700 represents any of the FIFOs shown in FIG. 2. Further, any of the FIFOs shown in FIG. 2 may include multiple FIFO storage blocks 700. For example, FIFO 122 (FIG. 2) may include four separate FIFOs 700 corresponding to the strobe/data sets (STB0_QW0, Byte0_QW0), (STB0_QW1, Byte0_QW1, (STB0_QW2, Byte0_QW2), and (STB0_QW3, Byte0_QW3).

FIFO storage block 700 includes "n" storage elements 710, 720, and 730, output multiplexer 740, input write logic 750, and output read logic 780. The storage elements and input write logic operate in the input data clock domain, and the output read logic and multiplexer operate in the FSB clock domain.

In operation, input write logic 750 provides control signals to write to the storage elements in sequence each time a rising edge of STBK_QWJ is received. For "n" storage elements corresponding to "n" FIFO locations, register 752 provides "n" control signals, one for each of the storage elements. A different one of the control signals from register 752 is asserted each time a rising edge of STBK_QWJ is received. Input write logic 750 shows a decoder, an adder, and a one-hot encoder to change the control signals sourced by register 752, although this is not a limitation of the present invention. For example, in some embodiments, a shift register may be utilized to propagate a control signal across the "n" FIFO write control signals.

Output read logic 780 produces a multiplexer control signal on node 784. When the multiplexer control signal is static, the FIFO output does not change. When the multiplexer control signal increments, the FIFO is read, or "drained." Control circuit 782 determines when to drain the FIFO based on a FIFO_DRAIN signal. Generation of the FIFO_DRAIN signal is described with reference to FIG. 2.

Figure 8:
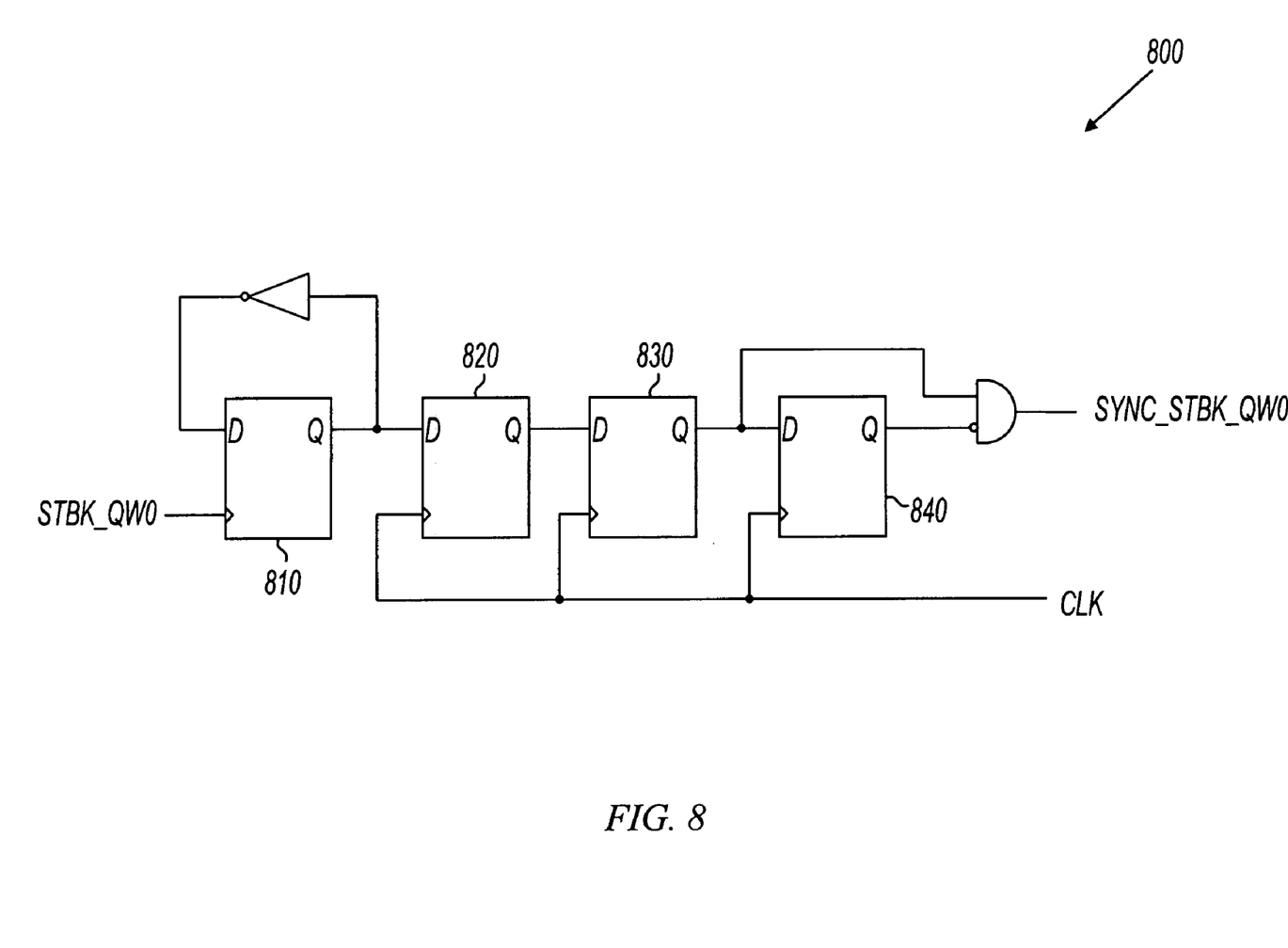
FIG. 8 shows a source synchronous strobe signal detection circuit.

FIG. 8 shows a source synchronous strobe signal detection circuit. Source synchronous strobe signal detection circuit 800 represents any of the strobe detection circuits shown in FIG. 2. Further, any of the strobe detection circuits shown in FIG. 2 may include multiple detection circuits 800. For example, strobe detection circuit 142 (FIG. 2) may include four separate source synchronous strobe signal detection circuits 800 corresponding to the source synchronous strobe signals STB0_QW0, STB0_QW1, STB0_QW2, and STB0_QW3.

Circuit 800 includes synchronous elements 810, 820, 830, and 840. Synchronous element 810 detects a rising edge on STBK_QWJ. Synchronous elements 820, 830, and 840 are clocked by a clock signal operating in the FSB clock domain. Source synchronous strobe signal detection circuit 800 asserts SYNC_STBK_QWJ in the FSB clock domain after the first assertion of STBK_QWJ in the input data clock domain.

Figure 9:
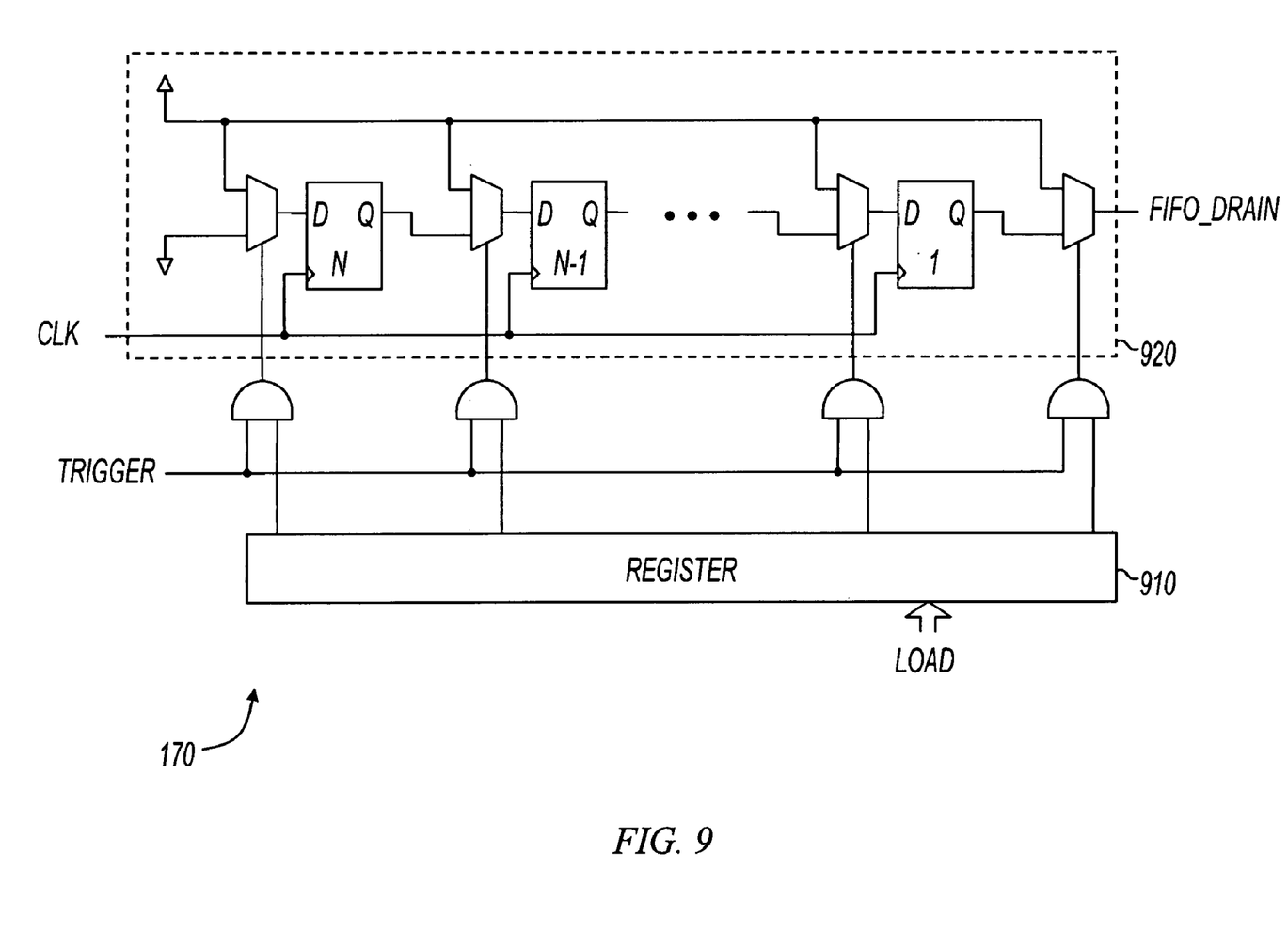
FIG. 9 shows a programmable delay circuit.

FIG. 9 shows a programmable delay circuit. Programmable delay circuit 170 includes register 910 and shift register 920. Upon reception of the TRIGGER signal, shift register 920 is loaded with the contents of register 910. As the example of FIG. 9, shift register 920 includes "N" stages, and can produce a programmable delay of between 1 and N FSB clock cycles. Referring now back to FIG. 2, delay circuit 170 receives the TRIGGER signal from logic 160, which in turn receives synchronized strobe signals from the various strobe detection circuits. Accordingly, the FIFO_DRAIN signal is produced after the first source synchronous strobe is received, where the time difference between the receipt of the source synchronous strobe and the FIFO_DRAIN signal is set by programmable delay circuit 170.

Figure 10:
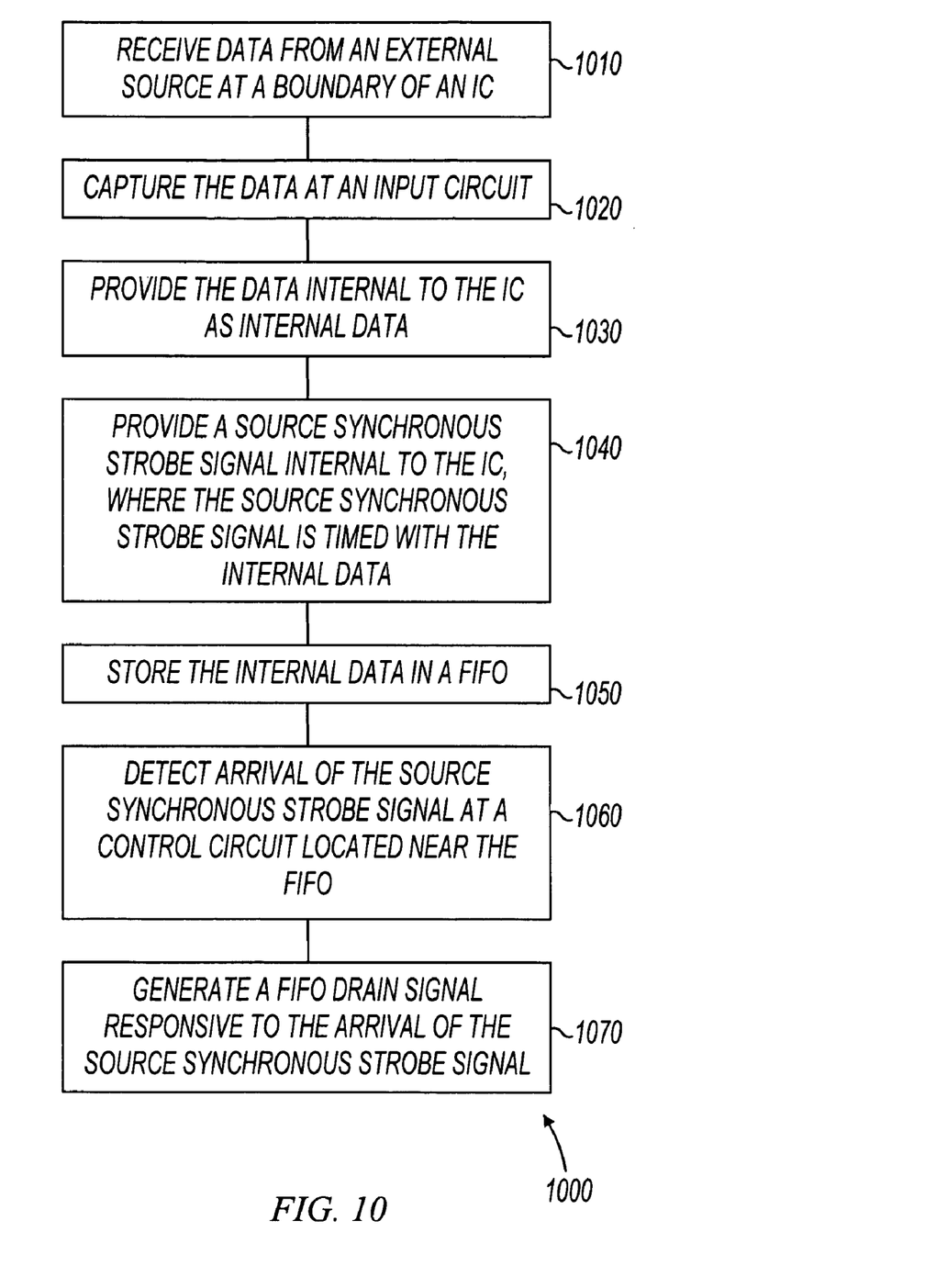
FIG. 10 shows a flowchart in accordance with various embodiments of the present invention.

FIG. 10 shows a flowchart in accordance with various embodiments of the present invention. In some embodiments, method 1000 may be used to perform dynamic adaptive read return of DRAM data. Method 1000 is not limited by the particular type of apparatus performing the method. The various actions in method 1000 may be performed in the order presented, or may be performed in a different order. Further, in some embodiments, some actions listed in FIG. 10 are omitted from method 1000.

Method 1000 begins at 1010 in which data is received from an external source at a boundary of an integrated circuit. At 1020, the data is captured at an input circuit; at 1030, the data is provided within the integrated circuit as internal data; and at a 1040, a source synchronous strobe signal is provided within the integrated circuit, where the source synchronous strobe signal is timed with the internal data. The actions of 1010, 1020, 1030, and 1040 correspond to the operation of a high-speed input/output (HSIO) circuit, such as those shown in FIGS. 1, 2, and 3.

At 1050, the internal data is stored in a FIFO, and at 1060, the arrival of the source synchronous strobe is detected at a control circuit near the FIFO. The actions of 1050 and 1060 correspond to the FIFO circuits shown in FIG. 2 receiving data, and the detection circuits shown in FIG. 2 receiving source synchronous strobe signals.

At 1070, a FIFO drain signal is generated responsive to the arrival of the source synchronous strobe signal. In some embodiments, the FIFO read signal is generated using a delay circuit such as delay circuit 170 (FIGS. 2, 9). The delay between the source synchronous strobe signal and the FIFO drain signal may be fixed or programmable.

Figure 11:
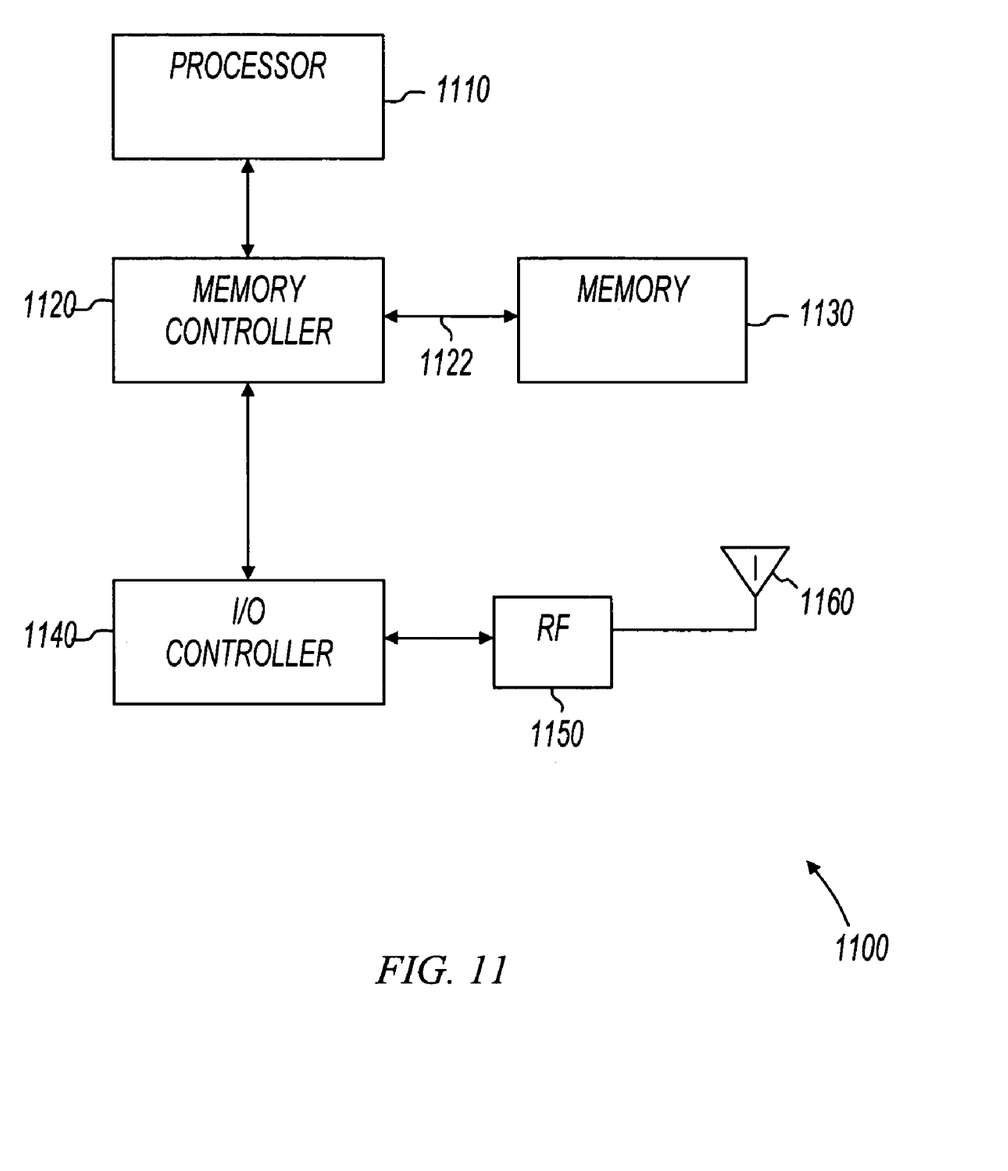
FIGS. 11 and 12 show diagrams of electronic systems in accordance with various embodiments of the present invention.

FIG. 11 shows an electronic system in accordance with various embodiments of the present invention. Electronic system 1100 includes processor 1110, memory controller 1120, memory 1130, input/output (I/O) controller 1140, radio frequency (RF) circuits 1150, and antenna 1160. In operation, system 1100 sends and receives signals using antenna 1160, and these signals are processed by the various elements shown in FIG. 11. Antenna 1160 may be a directional antenna or an omni-directional antenna. As used herein, the term omni-directional antenna refers to any antenna having a substantially uniform pattern in at least one plane. For example, in some embodiments, antenna 1160 may be an omni-directional antenna such as a dipole antenna, or a quarter wave antenna. Also for example, in some embodiments, antenna 1160 may be a directional antenna such as a parabolic dish antenna, a patch antenna, or a Yagi antenna. In some embodiments, antenna 1160 may include multiple physical antennas.

Radio frequency circuit 1150 communicates with antenna 1160 and I/O controller 1140. In some embodiments, RF circuit 1150 includes a physical interface (PHY) corresponding to a communications protocol. For example, RF circuit 1150 may include modulators, demodulators, mixers, frequency synthesizers, low noise amplifiers, power amplifiers, and the like. In some embodiments, RF circuit 1150 may include a heterodyne receiver, and in other embodiments, RF circuit 1150 may include a direct conversion receiver. In some embodiments, RF circuit 1150 may include multiple receivers. For example, in embodiments with multiple antennas 1160, each antenna may be coupled to a corresponding receiver. In operation, RF circuit 1150 receives communications signals from antenna 1160, and provides analog or digital signals to I/O controller 1140. Further, I/O controller 1140 may provide signals to RF circuit 1150, which operates on the signals and then transmits them to antenna 1160.

Processor 1110 may be any type of processing device. For example, processor 1110 may be a microprocessor, a microcontroller, or the like. Further, processor 1110 may include any number of processing cores, or may include any number of separate processors.

Memory controller 1120 provides a communications path between processor 1110 and other devices shown in FIG. 11. In some embodiments, memory controller 1120 is part of a hub device that provides other functions as well. As shown in FIG. 11, memory controller 1120 is coupled to processor 1110, I/O controller 1140, and memory 1130.

Memory 1130 may be any type of memory technology. For example, memory 1130 may be random access memory (RAM), dynamic random access memory (DRAM), static random access memory (SRAM), nonvolatile memory such as FLASH memory, or any other type of memory.

Memory 1130 may represent a single memory device or a number of memory devices on one or more memory modules. Memory controller 1120 provides data through bus 1122 to memory 1130 and receives data from memory 1130 in response to read requests. Commands and/or addresses may be provided to memory 1130 through conductors other than bus 1122 or through bus 1122. Memory controller 1130 may receive data to be stored in memory 1130 from processor 1110 or from another source. Memory controller 1120 may provide the data it receives from memory 1130 to processor 1110 or to another destination. Bus 1122 may be a bi-directional bus or unidirectional bus. Bus 1122 may include many parallel conductors. The signals may be differential or single ended.

Memory controller 1120 is also coupled to I/O controller 1140, and provides a communications path between processor 1110 and I/O controller 1140. I/O controller 1140 includes circuitry for communicating with I/O circuits such as serial ports, parallel ports, universal serial bus (USB) ports, and the like. As shown in FIG. 11, I/O controller 1140 provides a communications path to RF circuits 1150.

Memory controller 1120 may utilize any of the dynamic adaptive read return of DRAM data embodiments described above. For example, memory controller 1120 may include the circuitry shown in FIG. 2. Further, memory controller 1120 may have one or more configuration registers to hold delay information to control the amount of delay in delay circuit 170 (FIG. 2).

Figure 12:
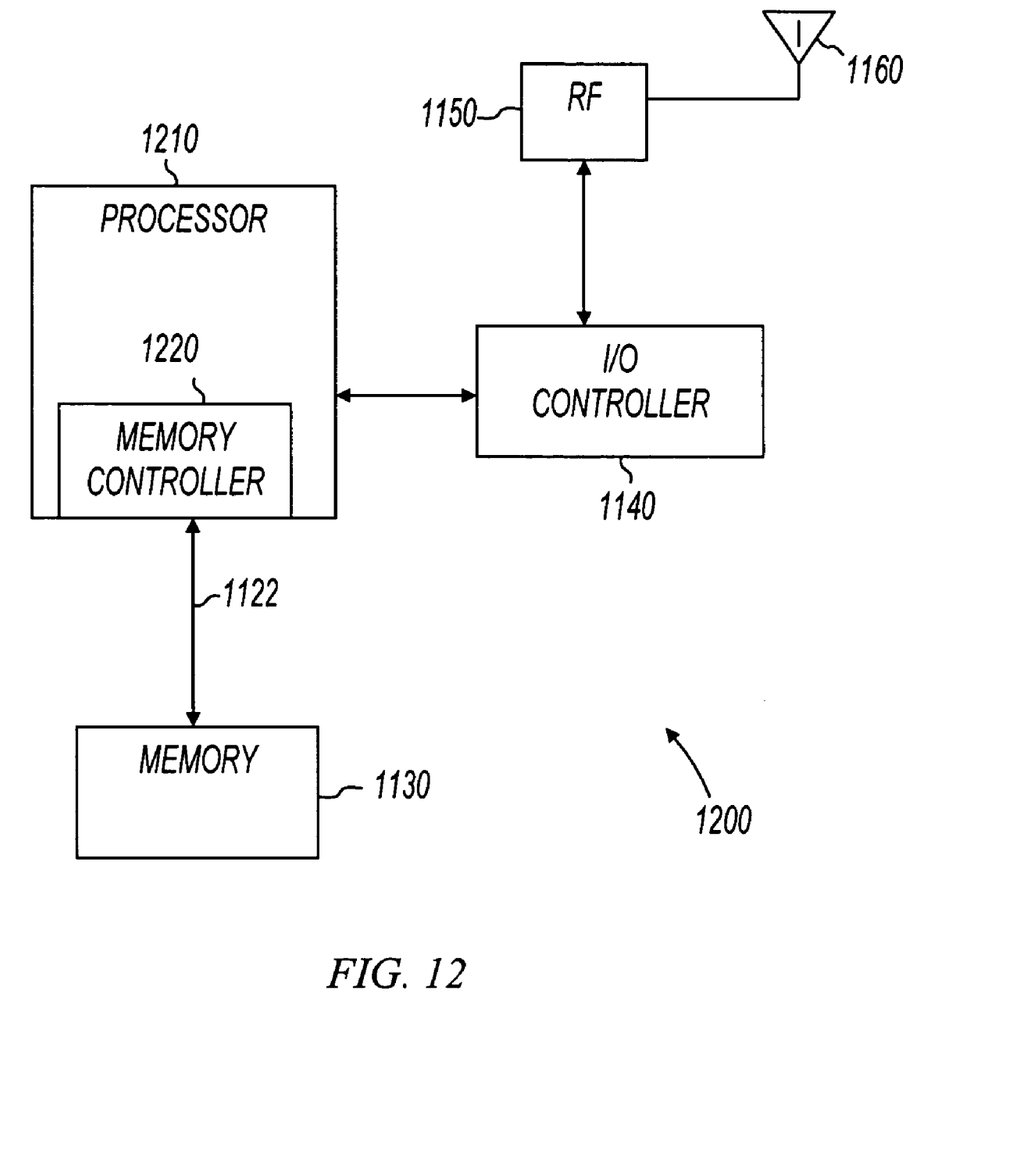

FIG. 12 shows an electronic system in accordance with various embodiments of the present invention. Electronic system 1200 includes memory 1130, I/O controller 1140, RF circuits 1150, and antenna 1160, all of which are described above with reference to FIG. 11. Electronic system 1200 also includes processor 1210 and memory controller 1220. As shown in FIG. 12, memory controller 1220 is included in processor 1210. Processor 1210 may be any type of processor as described above with reference to processor 1110 (FIG. 11). Processor 1210 differs from processor 1110 in that processor 1210 includes memory controller 1220, whereas processor 1110 does not include a memory controller.

Example systems represented by FIGS. 11 and 12 include desktop computers, laptop computers, cellular phones, personal digital assistants, wireless local area network interfaces, or any other suitable system. Many other systems uses exist for dynamic adaptive read return. For example, the dynamic adaptive read return embodiments described herein may be used in a server computer, a network bridge or router, or any other system with or without an antenna.

Although the present invention has been described in conjunction with certain embodiments, it is to be understood that modifications and variations may be resorted to without departing from the spirit and scope of the invention as those skilled in the art readily understand. Such modifications and variations are considered to be within the scope of the invention and the appended claims.

What is claimed is:

1. An integrated circuit comprising:
a plurality of input circuits to receive data from outside the integrated circuit and produce internal data and source synchronous strobe signals within the integrated circuit;
a plurality of FIFO storage units to store the internal data;
detection circuitry to detect arrival of a first of the source synchronous strobe signals; and
a delay circuit responsive to the detection circuitry to produce a FIFO drain control signal;
wherein the plurality of input circuits comprises nine input circuits, each of the nine input circuits comprising a byte-wide input, four byte-wide outputs, and demultiplexing circuitry to demultiplex by a factor of four the data from outside the integrated circuit.

2. The integrated circuit of claim 1 wherein the delay circuit is programmable to have a programmable delay value.

3. The integrated circuit of claim 1 wherein the delay circuit has a fixed delay.

4. The integrated circuit of claim 1 wherein the detection circuitry is responsive to nine source synchronous strobe signals, where each of the source synchronous strobe signals corresponds to one of the nine input circuits.

5. The integrated circuit of claim 1 wherein the plurality of input circuits operate in a first clock domain, and the delay circuit operates in a second clock domain.

6. The integrated circuit of claim 5 wherein the FIFO storage units are loaded in the first clock domain, and drained in the second clock domain.

7. The integrated circuit of claim 1 wherein the integrated circuit comprises a memory controller.

8. A method comprising:
receiving data from an external source at a boundary of an integrated circuit;
capturing the data at an input circuit;
providing the data within the integrated circuit as internal data;
providing a source synchronous strobe signal within the integrated circuit wherein the source synchronous strobe signal is timed with the internal data;
storing the internal data into a FIFO;
detecting arrival of the source synchronous strobe signal at a control circuit located near the FIFO; and
generating a FIFO drain signal responsive to the arrival of the source synchronous strobe signal at the control circuit;
wherein the input circuit operates in a first clock domain, and the data is captured at the input circuit in the first clock domain, wherein storing internal data into the FIFO operates in the first clock domain, and wherein detecting arrival of the source synchronous strobe signal operates in a second clock domain.

9. The method of claim 8 wherein generating the FIFO drain signal operates in the second clock domain.

10. The method of claim 9 wherein generating the FIFO drain signal comprises providing a programmable delay.

11. The method of claim 9 wherein generating the FIFO drain signal comprises providing a fixed delay.

12. A method comprising:
   receiving data from an external source at a boundary of an integrated circuit;
   capturing the data at an input circuit;
   providing the data within the integrated circuit as internal data;
   providing a source synchronous strobe signal within the integrated circuit wherein the source synchronous strobe signal is timed with the internal data;
   storing the internal data into a FIFO;
   detecting arrival of the source synchronous strobe signal at a control circuit located near the FIFO; and
   generating a FIFO drain signal responsive to the arrival of the source synchronous strobe signal at the control circuit;
   wherein providing the data as internal data comprises demultiplexing the data into four separate streams of internal data in the first clock domain.

13. A system comprising:
   an antenna;
   radio frequency circuitry coupled to the antenna; and
   an integrated circuit coupled to the radio frequency circuit, the integrated circuit comprising a plurality of input circuits to receive data from outside the integrated circuit and produce internal data and source synchronous strobe signals within the integrated circuit, a plurality of FIFO storage units to store the internal data, detection circuitry to detect arrival of a first of the source synchronous strobe signals, and a delay circuit responsive to the detection circuitry to produce a FIFO drain control signal, wherein each of the plurality of input circuits comprises demultiplexing circuitry to demultiplex by a factor of four the data from outside the integrated circuit.

14. The system of claim 13 wherein the delay circuit is programmable to have a programmable delay value.

15. The system of claim 13 wherein the plurality of input circuits operate in a first clock domain, and the delay circuit operates in a second clock domain.

16. The system of claim 13 wherein the integrated circuit comprises a memory controller.

17. An integrated circuit comprising:
   a plurality of input circuits to receive data from outside the integrated circuit and produce internal data and source synchronous strobe signals within the integrated circuit, wherein each of the plurality of input circuits comprises demultiplexing circuitry to demultiplex by a factor of four the data from outside the integrated circuit;
   a plurality of FIFO storage units to store the internal data;
   detection circuitry to detect arrival of a first of the source synchronous strobe signals; and
   a delay circuit responsive to the detection circuitry to produce a FIFO drain control signal.

18. The integrated circuit of claim 17 wherein the plurality of input circuits operate in a first clock domain, and the delay circuit operates in a second clock domain.

19. The integrated circuit of claim 18 wherein the FIFO storage units are loaded in the first clock domain, and drained in the second clock domain.

20. The integrated circuit of claim 17 wherein the integrated circuit comprises a memory controller.

* * * * *